US012277956B2

(12) United States Patent
Oozeki et al.

(10) Patent No.: US 12,277,956 B2
(45) Date of Patent: Apr. 15, 2025

(54) MAGNETIC DISK DEVICE, METHOD OF CONTROLLING MAGNETIC DISK DEVICE, AND COMPUTER PROGRAM PRODUCT

(71) Applicants: Kabushiki Kaisha Toshiba, Tokyo (JP); Toshiba Electronic Devices & Storage Corporation, Tokyo (JP)

(72) Inventors: Kenichiro Oozeki, Yokohama Kanagawa (JP); Yu Chen, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/424,104

(22) Filed: Jan. 26, 2024

(65) Prior Publication Data

US 2024/0412760 A1   Dec. 12, 2024

(30) Foreign Application Priority Data

Jun. 7, 2023   (JP) ................... 2023-093996

(51) Int. Cl.
*G11B 5/54*      (2006.01)
*G11B 5/48*      (2006.01)
*G11B 20/10*     (2006.01)
*G11B 33/08*     (2006.01)

(52) U.S. Cl.
CPC .................. *G11B 5/4826* (2013.01)

(58) Field of Classification Search
CPC ....... G11B 5/556; G11B 5/483; G11B 5/4873; G11B 5/5526; G11B 21/106; G11B 5/6017; G11B 5/4826; G11B 5/4833; G11B 5/5552; G11B 5/6011; G11B 2005/0001; G11B 20/10027; G11B 33/08; G11B 5/54
USPC .......................................................... 360/75
See application file for complete search history.

(56) References Cited

U.S. PATENT DOCUMENTS

| | | | |
|---|---|---|---|
| 6,646,825 B1 | 11/2003 | Kaneda et al. | |
| 9,007,714 B1 | 4/2015 | Zheng et al. | |
| 10,803,899 B2 * | 10/2020 | Ishii ................ | G11B 5/4984 |
| 11,393,496 B2 | 7/2022 | Atitallah et al. | |
| 11,749,303 B2 | 9/2023 | Byoun et al. | |

FOREIGN PATENT DOCUMENTS

JP   H04-113850 A   4/1992

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a first MA amplifier that drives a first micro actuator that positions a corresponding magnetic head, a second micro actuator that positions a corresponding magnetic head, a second MA amplifier that drives the second micro actuator, and a controller that, when performing switching from an MA amplifier of a switching source in an on state to an MA amplifier of a switching destination in an off state, starts up the MA amplifier of the switching destination while maintaining the MA amplifier of the switching source in the on state, and performs the switching from the MA amplifier of the switching source to the MA amplifier of the switching destination after a predetermined time elapses.

18 Claims, 11 Drawing Sheets

FIG.8

| | MAGNETIC HEAD ID | H0 | H3 | H4 | H1 | H6 | H5 |
|---|---|---|---|---|---|---|---|
| (A) | CORRESPONDING MA | MA1 | MA2 | MA1 | MA2 | MA1 | MA2 |

⇩

| | MAGNETIC HEAD ID | H0 | H4 | H6 | H1 | H3 | H5 |
|---|---|---|---|---|---|---|---|
| (B) | CORRESPONDING MA | MA1 | MA1 | MA1 | MA2 | MA2 | MA2 |

FIG.10

| MAGNETIC HEAD ID | CORRESPONDING MA | VIBRATION RANK |
|---|---|---|
| H0 | MA1 | S |
| H1 | MA2 | S |
| H2 | MA1 | M |
| H3 | MA2 | M |
| ... | ... | ... |
| H16 | MA1 | S |
| H17 | MA2 | S |
| H18 | MA1 | L |
| H19 | MA2 | L |
| ... | ... | ... |

MAGNETIC DISK DEVICE, METHOD OF CONTROLLING MAGNETIC DISK DEVICE, AND COMPUTER PROGRAM PRODUCT

CROSS-REFERENCE TO RELATED APPLICATIONS

This application is based upon and claims the benefit of priority from Japanese Patent Application No. 2023-093996, filed on Jun. 7, 2023, the entire contents of which are incorporated herein by reference.

FIELD

Embodiments described herein relate generally to a magnetic disk device, a method of controlling the magnetic disk device, and a computer program product.

BACKGROUND

Conventionally, in order to improve a characteristic of a micro actuator that positions magnetic heads in an HDD as a magnetic disk device, and to shorten a processing time in self servo write (SSW) in which a product servo pattern is written by an external circuit by using only an offset control function or a mechanical mechanism of an HDD main body, a function of simultaneously driving a plurality of micro actuators has been suggested.

In a case where such a configuration is adopted, a plurality of systems of micro actuator amplifiers (MA amplifiers) is provided in one HDD, and standby power increases in an environment in which an HDD product is actually used. As a countermeasure for this, an MA amplifier of a magnetic head that is not used is turned off.

In the conventional art, on/off switching of the MA amplifier that supplies drive power for driving the micro actuator is performed at the start of seeking; however, at the time of this switching, vibration of the suspension that holds the magnetic head occurs, positioning accuracy of the magnetic head deteriorates, and random access performance of the HDD deteriorates.

In order to solve this problem, for example, a technology of providing an inclination to the voltage of the MA amplifier in a piezo drive circuit has been proposed; however, if the inclination of the voltage of the MA amplifier is merely made gradual, it takes time to switch, and eventually, the random access performance of the HDD deteriorates.

BRIEF DESCRIPTION OF THE DRAWINGS

FIG. 8 is an illustrative diagram of an example of switching of an MA amplifier according to the first embodiment;

FIG. 10 is an illustrative diagram of an example of a control data table used in a third embodiment.

DETAILED DESCRIPTION

In general, according to one embodiment, a magnetic disk device includes a first MA amplifier configured to drive a first micro actuator that positions a corresponding magnetic head, a second micro actuator configured to position a corresponding magnetic head, a second MA amplifier configured to drive the second micro actuator, and a controller configured to, when performing switching from an MA amplifier of a switching source in an on state to an MA amplifier of a switching destination in an off state, start up the MA amplifier of the switching destination while maintaining the MA amplifier of the switching source in the on state, and perform the switching from the MA amplifier of the switching source to the MA amplifier of the switching destination after a predetermined time elapses.

Exemplary embodiments of a magnetic disk device, a method of controlling the magnetic disk device, and a computer program product will be explained below in detail with reference to the accompanying drawings. The present invention is not limited to the following embodiments.

First Embodiment

Figure 1:
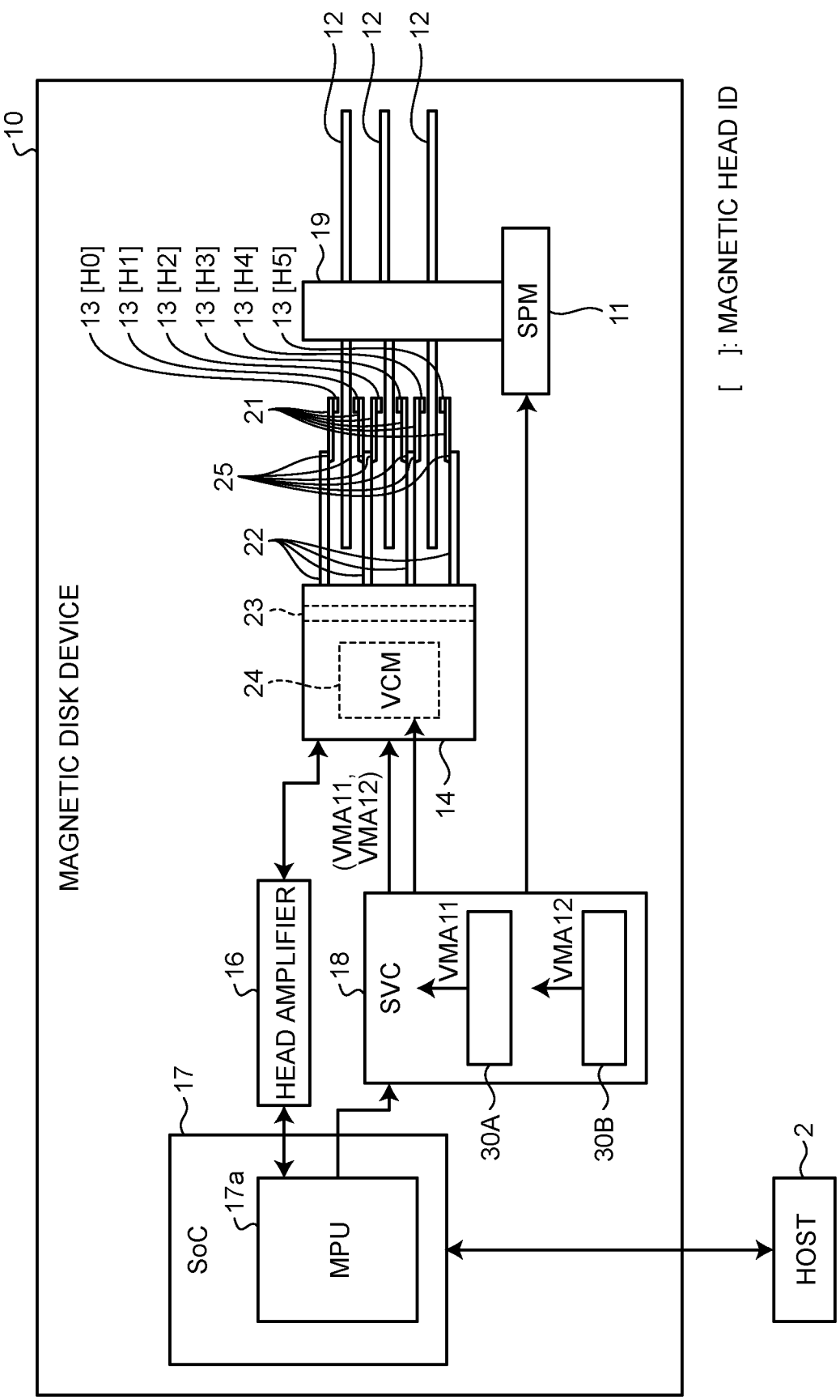
FIG. 1 is an illustrative diagram of a schematic configuration example of a magnetic disk device according to an embodiment.

FIG. 1 is an illustrative diagram of a schematic configuration example of a magnetic disk device according to an embodiment. A magnetic disk device 10 is, for example, a hard disk drive (HDD). Note that, the magnetic disk device 10 may be another magnetic disk device such as a hybrid HDD.

The magnetic disk device 10 is connectable to a host 2 via a communication line. Herein, the magnetic disk device 10 and the host 2 can perform communication via the communication line using a communication protocol conforming to a serial attached SCSI (SAS) standard, for example. Note that, the standard of the communication line between the magnetic disk device 10 and the host 2 is not limited to this example.

The host 2 is configured as, for example, a processor, a personal computer, or a server. The magnetic disk device 10 can receive an access command (for example, a read command and a write command) from the host 2.

Figure 2:
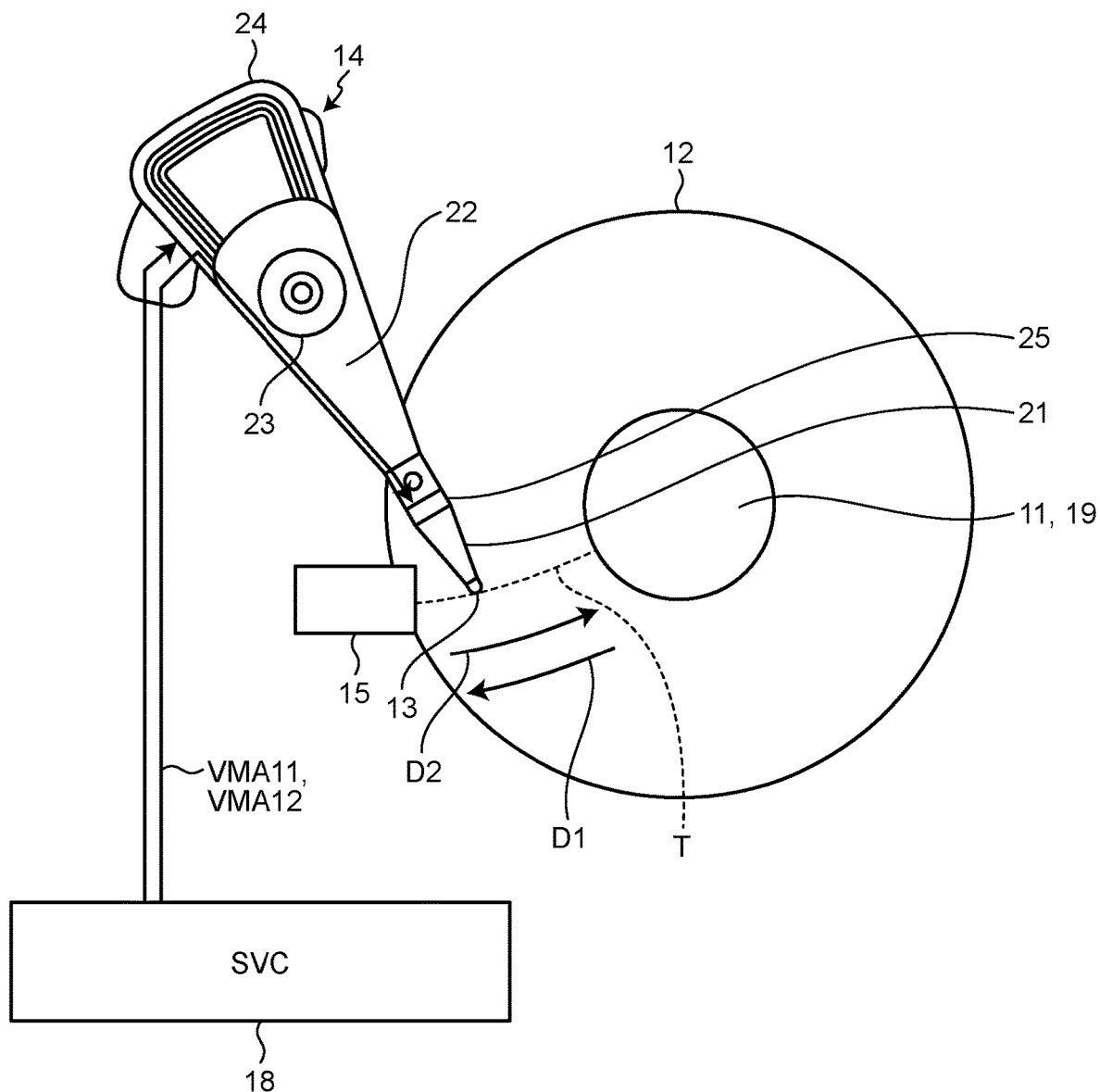
FIG. 2 is a plane view of the schematic configuration example of the magnetic disk device according to the embodiment.

FIG. 2 is a plane view of the schematic configuration example of the magnetic disk device according to the embodiment. The magnetic disk device 10 includes a spindle motor (SPM) 11, a plurality of magnetic disks 12, a plurality of magnetic heads 13, an actuator unit 14, a ramp load mechanism 15, a head amplifier 16, an SoC 17, and a servo controller (SVC) 18.

The spindle motor 11 includes a rotation shaft 19. The plurality of magnetic disks 12 is held on the rotation shaft 19 with, for example, a clamp. The spindle motor 11 integrally rotates the plurality of magnetic disks 12 about the rotation shaft 19.

On both surfaces of the plurality of magnetic disks 12, recording surfaces capable of recording data are formed. The number of the plurality of magnetic heads 13 is set so that the plurality of magnetic heads 13 can access the recording surfaces of the plurality of magnetic disks 12.

Each of the plurality of magnetic heads 13 is provided so as to be able to face the recording surface of the corresponding magnetic disk 12. Each of the plurality of magnetic heads 13 can record data and reproduce data on the recording surface of the magnetic disk 12 to which the magnetic head 13 faces. In FIG. 1, for simplicity of illustration and easier understanding, six magnetic heads of magnetic head IDs=H0 to H5 are illustrated as the magnetic heads 13, but actually, more (for example, 20) magnetic heads 13 are provided.

Furthermore, as illustrated in FIG. 1, the actuator unit 14 includes a plurality of suspensions 21, a plurality of actuator arms 22, a rotation shaft 23, a voice coil motor (VCM) 24, and a plurality of micro actuators (MA) 25.

Each of the plurality of suspensions 21 is formed into an elastically deformable plate shape. Each of the plurality of suspensions 21 supports corresponding one of the plurality of magnetic heads 13 in the vicinity of a tip end of the suspension 21.

One end of the plurality of actuator arms 22 is supported by the rotation shaft 23 so as to be rotatable about the rotation shaft 23. Corresponding one of the plurality of suspensions 21 is attached to the other end of each of the plurality of actuator arms 22.

The voice coil motor 24 rotates the actuator arm 22 and the suspension 21 attached to the actuator arm 22 within a predetermined range about the rotation shaft 23. The rotation shaft 19 of the SPM 11 and the rotation shaft 23 of the actuator unit 14 are provided so as to be substantially parallel to each other at positions separated from each other. Therefore, the voice coil motor 24 can move the magnetic head 13 supported by the suspension 21 with respect to the magnetic disk 12.

The voice coil motor 24 moves the actuator arm 22 substantially parallel to the recording surface of the magnetic disk 12. The voice coil motor 24 of this embodiment moves the magnetic head 13 in a radial direction substantially orthogonal to the rotation shaft 19 with respect to the magnetic disk 12.

The micro actuator 25 is provided at a connection between the suspension 21 and the actuator arm 22. The micro actuator 25 is, for example, an actuator element such as a piezoelectric element. The micro actuator 25 can move the suspension 21 substantially parallel to the recording surface of the magnetic disk 12. That is, the actuator unit 14 is configured as a two-stage actuator that moves the magnetic head 13 by the voice coil motor 24 and the micro actuator 25.

In the above-described configuration, the number of suspensions 21, actuator arms 22, and micro actuators 25 is set corresponding to the number of magnetic heads 13. Furthermore, the actuator unit 14 may include a plurality of voice coil motors 24.

The actuator unit 14 can move the magnetic head 13 by the voice coil motor 24 and the micro actuator 25 with respect to the recording surface of the magnetic disk 12 along a trajectory T. The ramp load mechanism 15 is provided on the trajectory T in the vicinity of an outer end of the magnetic disk 12. Therefore, the voice coil motor 24 can move the magnetic head 13 between the ramp load mechanism 15 and the rotation shaft 19.

The ramp load mechanism 15 parks the plurality of magnetic heads 13 at the time of unloading and retraction, for example. For example, the ramp load mechanism 15 can hold the magnetic head 13 supported by the suspension 21 at a retracted position by supporting a lift tab provided at the tip end of the suspension 21.

The head amplifier 16 illustrated in FIG. 1 amplifies a signal read from the magnetic disk 12 by the magnetic head 13 to output, and supplies the same to the SoC 17. The SoC 17 demodulates the signal supplied from the head amplifier 16 into digital data by a read channel circuit.

Moreover, the head amplifier 16 is supplied with a signal corresponding to the digital data from the SoC 17. The head amplifier 16 amplifies the signal supplied from the SoC 17 and supplies the same to the magnetic head 13. The magnetic head 13 records the signal supplied from the head amplifier 16 on the recording surface of the magnetic disk 12.

The SVC 18 controls the voice coil motor 24 and the micro actuator 25 of the actuator unit 14. Specifically, the SVC 18 drives the actuator unit 14 on the basis of an instruction from the SoC 17 to position the magnetic head 13 at a position instructed by the SoC 17.

Moreover, the SVC 18 drives the spindle motor 11 on the basis of the instruction from the SoC 17. The SVC 18 drives the spindle motor 11 in such a manner that a rotation speed of the spindle motor 11 becomes constant at a predetermined target speed.

The SVC 18 retracts the magnetic head 13 when power supply to the magnetic disk device 10 is cut off. Moreover, the SVC 18 may retract the magnetic head 13 in a case where a seek error occurs in positioning control of the magnetic head 13.

The SoC 17 is electrically connected to the host 2. The SoC 17 interprets the access command from the host 2 and executes various controls such as access to the magnetic disk 12 on the basis of an interpretation result.

The SoC 17 includes a micro-processing unit (MPU) 17a. The MPU 17a operates according to a firmware program. The firmware program is stored in a predetermined non-volatile storage area. The predetermined non-volatile storage area may be the magnetic disk 12 or a read only memory (ROM) of the SoC 17.

The MPU 17a controls an entire operation of the magnetic disk device 10. For example, the MPU 17a controls the access to the magnetic disk 12 using the magnetic head 13 via the head amplifier 16. Furthermore, the MPU 17a instructs the SVC 18 to control rotation of the spindle motor 11, and executes control of loading/unloading of the actuator unit 14 via the SVC 18.

Furthermore, in the positioning control, the MPU 17a calculates an instruction value of a drive voltage of the VCM 24 and an instruction value of a drive voltage of the MA 25 in order to cause the position of the magnetic head 13 to follow a target position pos target. The MPU 17a calculates each instruction value using a position signal pos read from servo information formed on the recording surface of the magnetic disk 12 by the magnetic head 13 as a feedback input, and transmits each obtained instruction value to the SVC 18.

The SVC 18 applies a voltage corresponding to the instruction value of the drive voltage of the voice coil motor 24 to the voice coil motor 24, and applies a voltage corresponding to the instruction value of the drive voltage of the micro actuator 25 to the micro actuator 25. Therefore, the magnetic head 13 is positioned at the target position.

Figure 3:
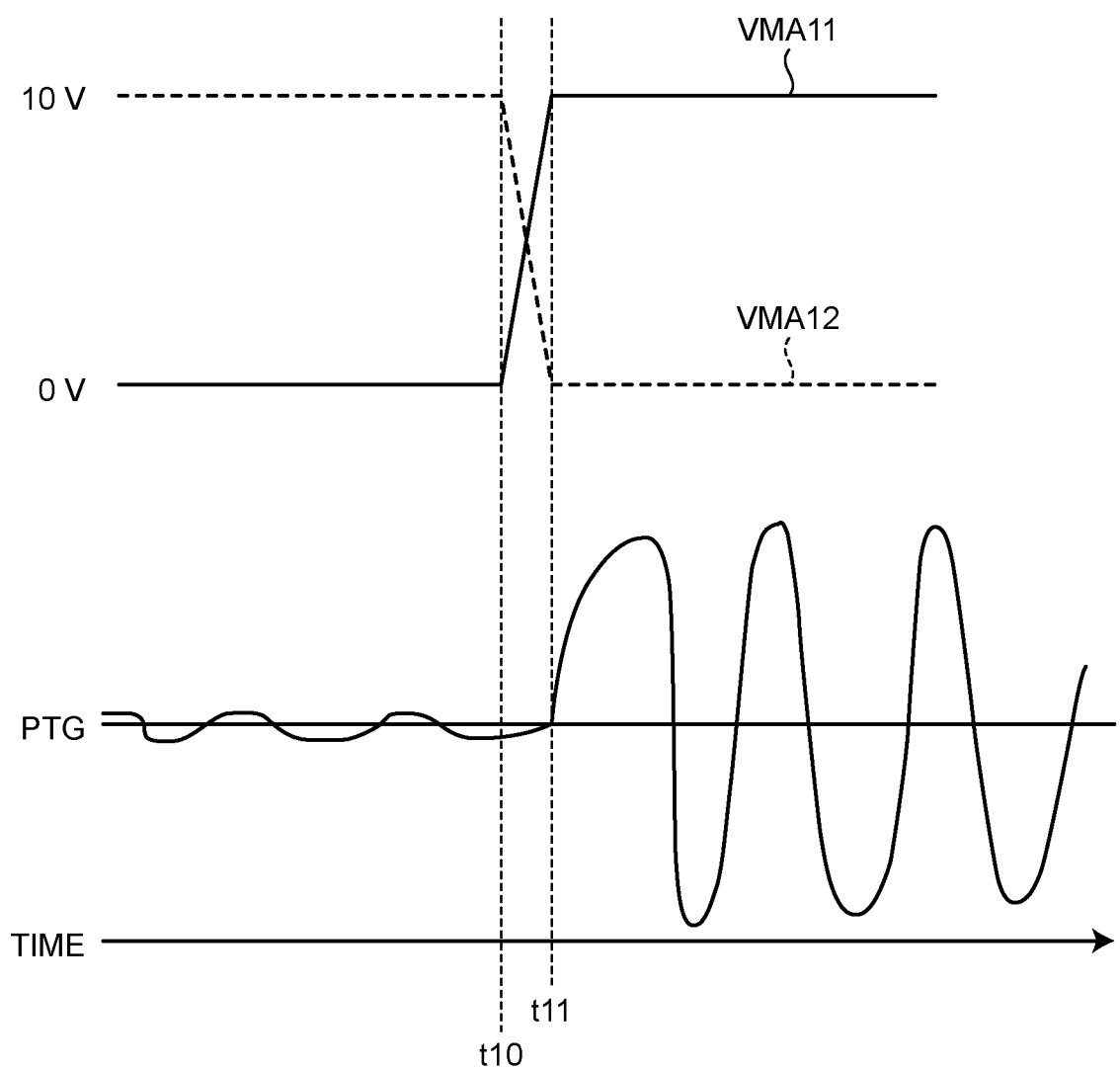
FIG. 3 is an illustrative diagram of an operation example at the time of conventional magnetic head change.

Next, prior to describing an operation of the embodiment, a conventional problem will be described first. FIG. 3 is an operation illustrative diagram at the time of conventional magnetic head change. In FIG. 3, the voltage applied from the MA amplifier to the micro actuator in a case where the micro actuator (MA) is turned on is set to 10 V, and the voltage applied from the MA amplifier to the micro actuator in a case where the micro actuator (MA) is turned off is set to 0 V.

In the example in FIG. 3, in a case where a micro actuator MA1 in an off state is turned on and a micro actuator MA2 in an on state is turned off, conventionally, an output voltage of the MA amplifier is changed at a first slew rate at time t10 immediately before time t11 corresponding to a head change timing to switch the micro actuator. More specifically, in a case where a voltage output from the first MA amplifier for driving the micro actuator MA1 is set to VMA11, and a voltage output from the second MA amplifier for driving the micro actuator MA2 is set to VMA12, the voltage VMA11 output from the first MA amplifier is increased at the first slew rate, and the voltage VMA12 output from the second MA amplifier is decreased at the first slew rate at time t10. In this case, vibration of the suspension that holds the magnetic head occurs, and as illustrated in FIG. 3, deviation of the magnetic head position with respect to a target position PTG increases after the head change, and positioning accuracy is deteriorated.

Figure 4:
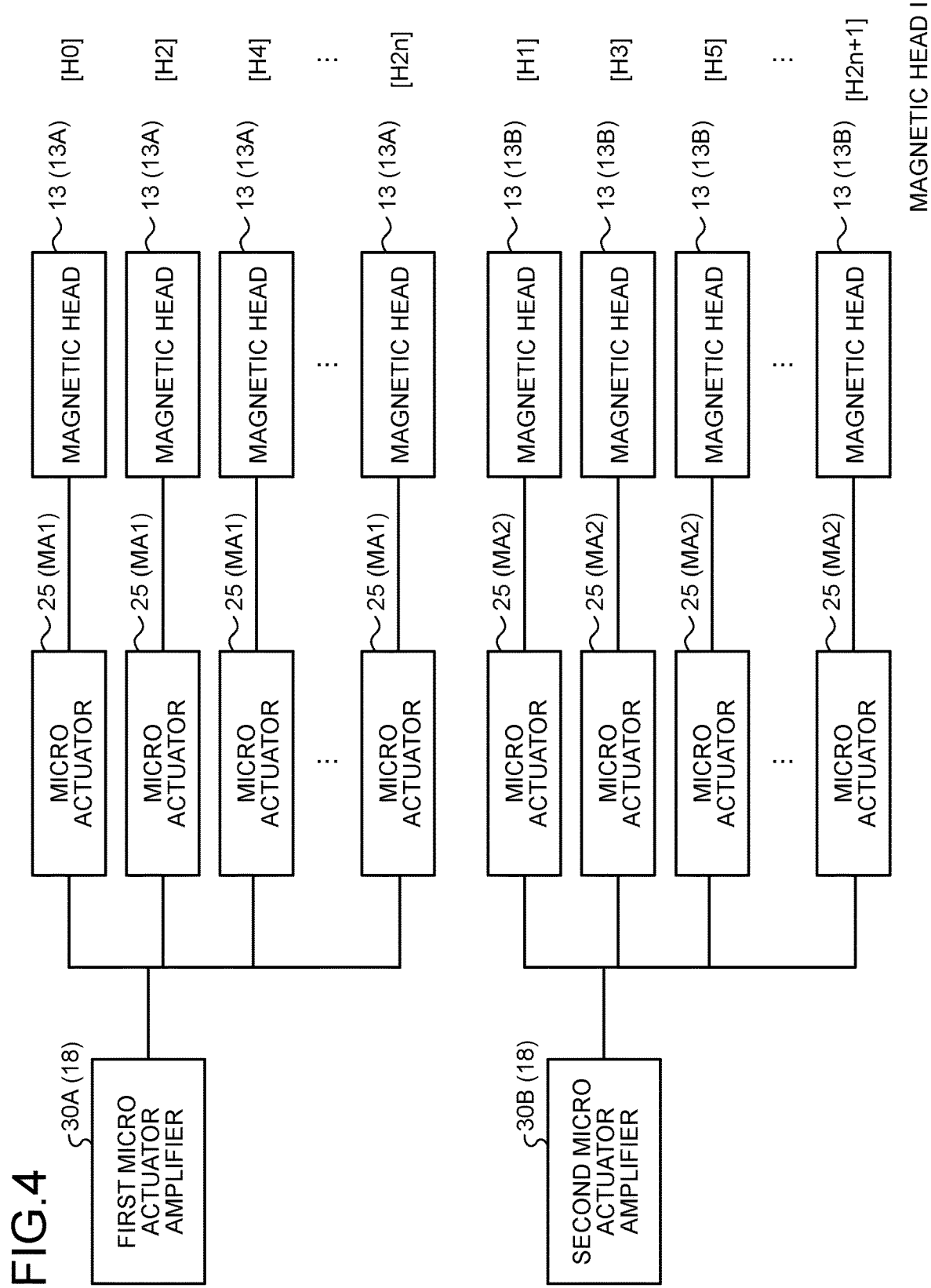
FIG. 4 is an illustrative diagram of an example of an operation principle of a first embodiment.

Next, an operation principle of a first embodiment is described. FIG. 4 is an illustrative diagram of the operation principle of the first embodiment. In FIG. 4, as the plurality of magnetic heads 13, n magnetic heads 13A with a suffix of a magnetic head ID of an even number (magnetic head IDs=H0, H2, H4, . . . , and H2n in the example in FIG. 4, wherein n is an integer not smaller than zero), and n magnetic heads 13B with a suffix of the magnetic head IDs of an odd number (magnetic head IDs=H1, H3, H5, . . . , and H2n+1 in the example in FIG. 4, wherein n is an integer not smaller than zero) are provided.

In the above-described configuration, the magnetic head 13A is driven by the corresponding micro actuator MA1, and the magnetic head 13B is driven by the corresponding micro actuator MA2.

Moreover, all the micro actuators MA1 are driven with power supplied from the first MA amplifier 30A. Similarly, all the micro actuators MA2 are driven with power supplied from the second MA amplifier 30B.

Figure 5:
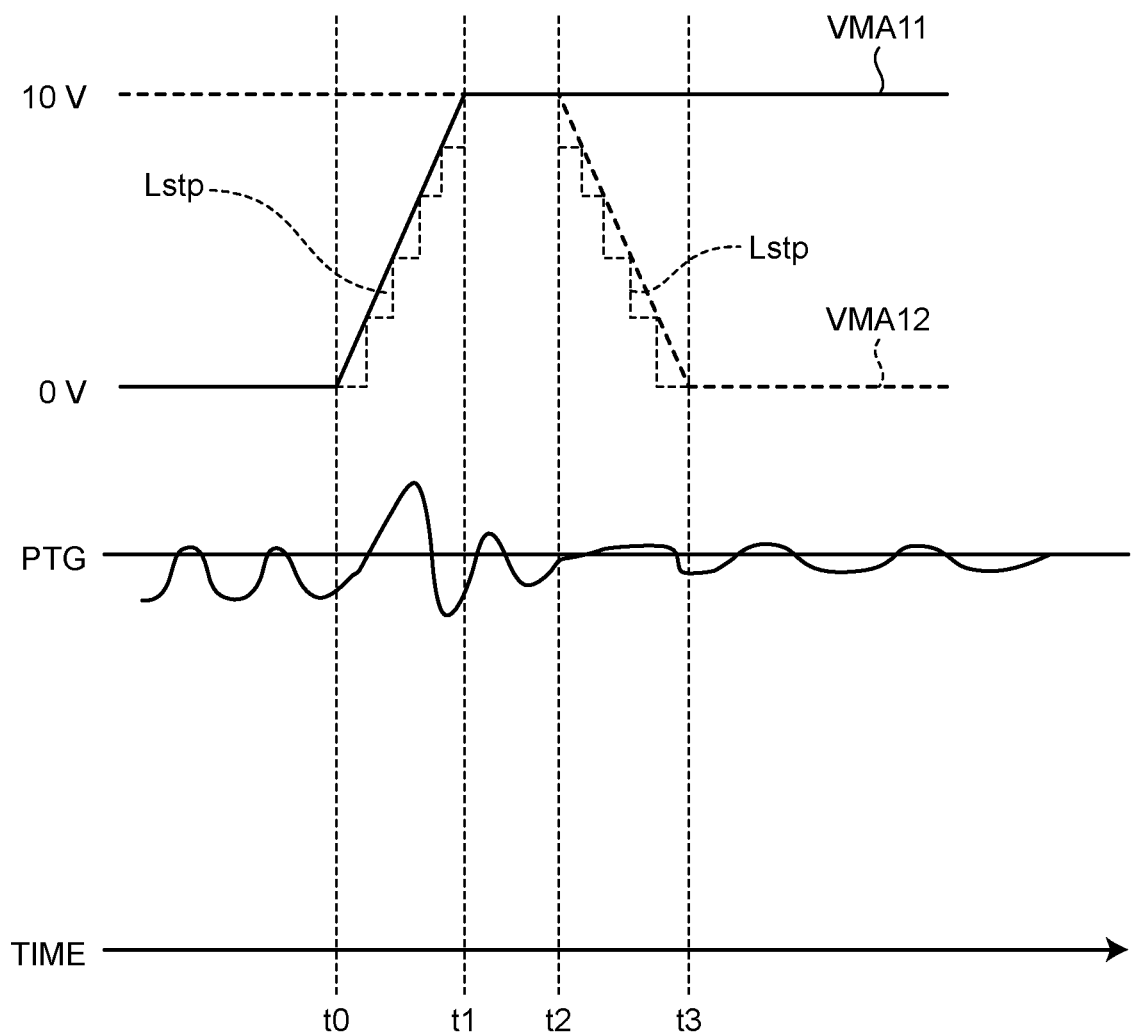
FIG. 5 is an illustrative diagram of an operation example at the time of magnetic head change of the first embodiment.

FIG. 5 is an operation illustrative diagram at the time of magnetic head change of the first embodiment. In FIG. 5 also, the voltage applied from the first MA amplifier 30A or the second MA amplifier 30B to the micro actuator 25 is set to 10 V in a case where the micro actuator 25 (MA1 or MA2) is turned on, and the voltage applied from the first MA amplifier 30A or the second MA amplifier 30B to the micro actuator 25 is set to 0 V in a case where the micro actuator 25 (MAL or MA2) is turned off.

In the example in FIG. 5, in a case where the micro actuator MA1 in the off state is turned on and the micro actuator MA2 in the on state is turned off, the output voltage of the MA amplifier is changed at an absolute value of a second slew rate (<an absolute value of the first slew rate) at time t0 (t1−t0>t11−t10) prior to time t1 corresponding to the head change timing. Herein, the first slew rate is an inclination of the signal at the time of signal rising, and the second slew rate is an inclination of the signal at the time of signal trailing.

More specifically, in a case where the corresponding micro actuator MA1 in the off state is turned on by the first MA amplifier 30A and the corresponding micro actuator MA2 in the on state is turned off by the second MA amplifier 30B, the output voltage of the first MA amplifier 30A is increased at the first slew rate so as to be from 0 V to 10 V, and the output voltage of the second MA amplifier 30B is decreased at the second slew rate so as to be from 10 V to 0 V.

Then, by increasing the voltage VMA11 applied by the first MA amplifier 30A to the micro actuator MA1 to be turned on at the first slew rate from time to, the voltage of the voltage VMA11 becomes 10 V corresponding to the on state at time t1.

Moreover, when the state is maintained and it reaches time t2 at which the vibration of the suspension that holds the magnetic head becomes small and stable, the micro actuator to be controlled is switched from the micro actuator MA2 to the micro actuator MA1.

In this case, both the micro actuator MA1 and the micro actuator MA2 are in the on state at a point of time from time t1 to time t2. Then, when it reaches time t2, by gradually decreasing the voltage VMA12 applied by the second MA amplifier 30B to the micro actuator MA2 to be turned off at the second slew rate, the voltage of the voltage VMA12 becomes 0 V corresponding to the off state at time t3.

By causing the above-described operation to be performed, the micro actuator to be controlled is switched, but in this case also, as illustrated in FIG. 5, the vibration of the suspension that holds the magnetic head 13B driven by the second MA amplifier 30B occurs. However, according to the embodiment, as compared with the case illustrated in FIG. 3, the vibration becomes small, the deviation of the magnetic head position after the head change with respect to the target position PTG becomes smaller than that in the conventional case, and it can be understood that the positioning accuracy can be improved.

Figure 6:
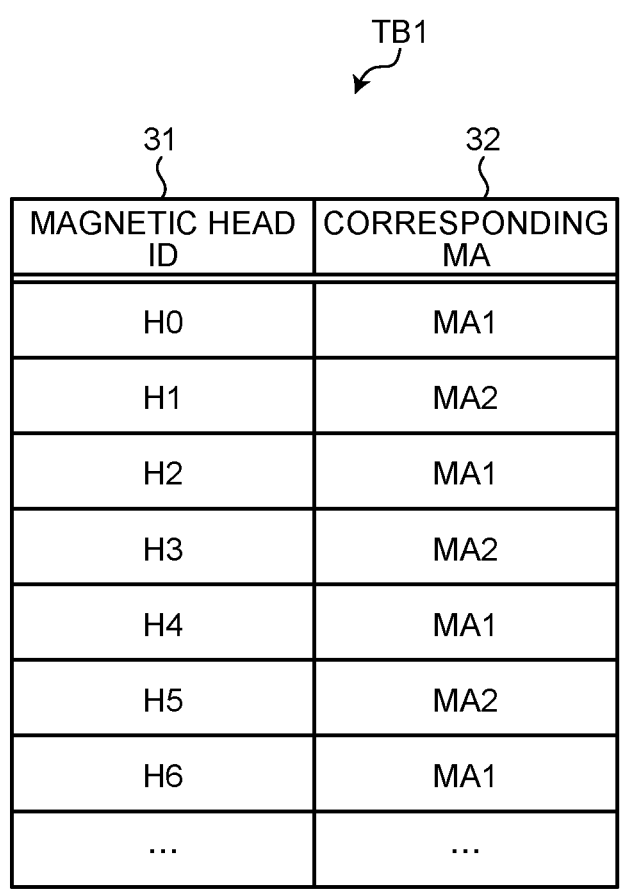
FIG. 6 is an illustrative diagram of an example of a control data table used in the first embodiment.

Next, a detailed operation of the first embodiment is described. FIG. 6 is an illustrative diagram of a control data table used in the first embodiment. A control data table TB1 of the first embodiment includes magnetic head ID data 31 for specifying each magnetic head 13 and corresponding MA data 32 for specifying the micro actuator corresponding to the magnetic head specified by the magnetic head ID data 31.

For example, the corresponding micro actuator that drives the magnetic head specified by the magnetic head ID="H1" is the micro actuator MA2, and the corresponding micro actuator that drives the magnetic head specified by the magnetic head ID="H4" is the micro actuator MA1. In other words, FIG. 6 illustrates that the first MA amplifier 30A drives the plurality of magnetic heads 13A specified by magnetic head IDs="H0", "H2", "H4", "H6", . . . via the corresponding micro actuator MA1. Similarly, it is illustrated that the second MA amplifier 30B drives the plurality of magnetic heads 13B specified by the magnetic head IDs="H1", "H3", "H5", "H7", . . . via the corresponding micro actuator MA2.

Figure 7:
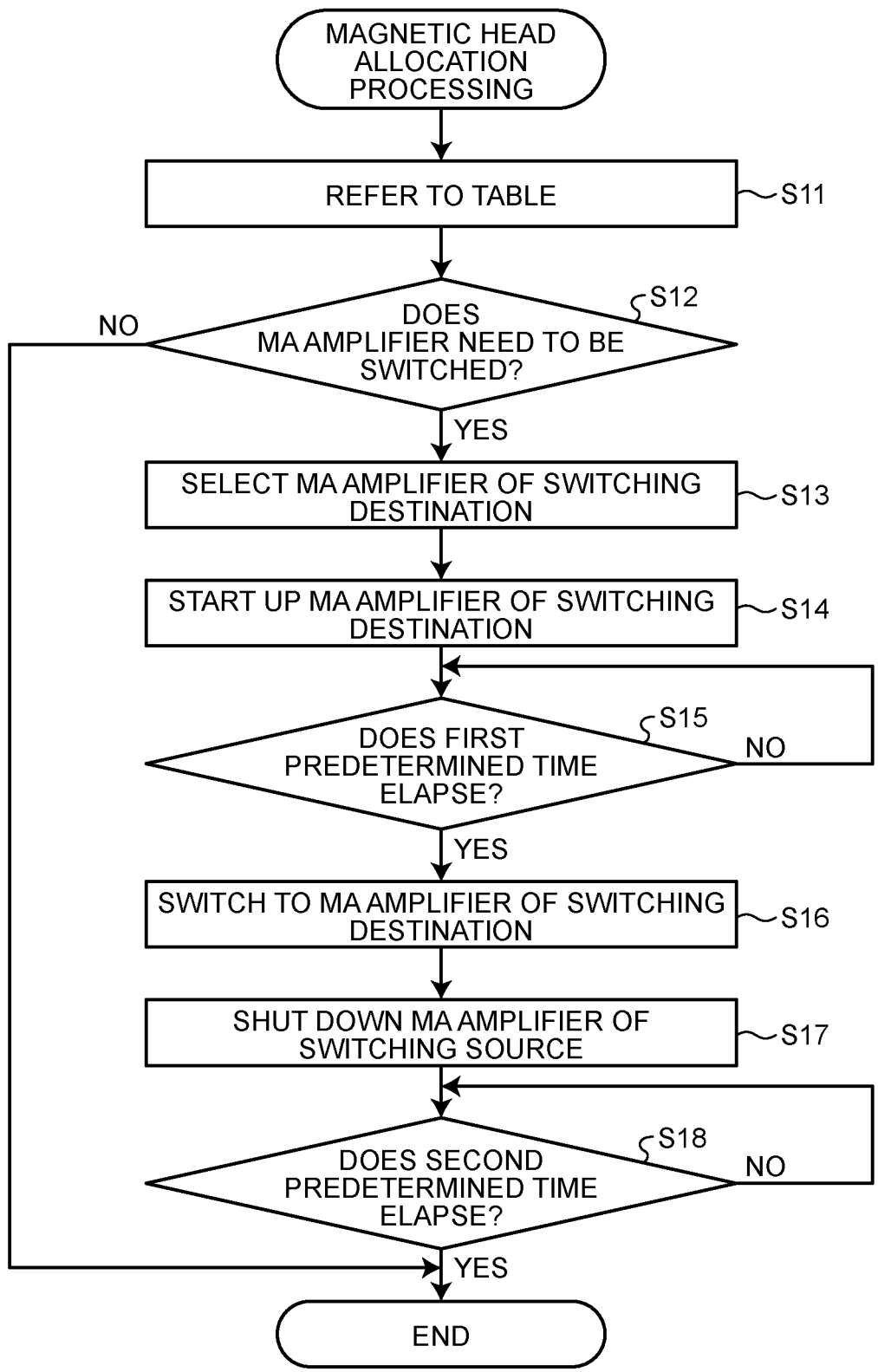
FIG. 7 is a flowchart illustrating an example of a procedure of switch processing of the micro actuator of the embodiment.

FIG. 7 is a processing flowchart of switch processing of the micro actuator of the embodiment. This switch processing of the micro actuator is performed by the MPU 17a of the SoC 17 by controlling the SVC 18. In magnetic head allocation processing, the SoC 17 refers to the control data table TB1 illustrated in FIG. 6 (step S11), and determines whether the MA amplifier needs to be switched on the basis of a content of the control data table (step S12). In a case where it is determined at step S12 that the MA amplifier does not need to be switched (step S12; No), the processing is finished. In a case where it is determined at step S12 that the MA amplifier needs to be switched (step S12; Yes), the MA amplifier of a switching destination is selected on the basis of the control data table TB1 illustrated in FIG. 5 referred to at step S11 (step S13).

FIG. 8 is an illustrative diagram of an example of switching of the MA amplifier according to the first embodiment. (A) of FIG. 8 illustrates a switching order of the MA amplifiers in a case of rearranging a seek order by conventional native command queuing (NCQ), and (B) of FIG. 8 illustrates the switching order of the MA amplifiers of the first embodiment. Conventionally, for example, as illustrated in (A) of FIG. 8, when a data access order is the magnetic head ID="H0"→the magnetic head ID "H3"→the magnetic head ID="H4"→the magnetic head ID="H1"→the magnetic head ID "H6"→the magnetic head ID="H5", the micro actuator to be turned on is changed every time the magnetic head is switched. As a result, as illustrated in FIG. 3, the vibration occurs, and the positioning accuracy is deteriorated. Therefore, in the first embodiment, the SoC 17 performs control to preferentially use the magnetic head driven by the same micro actuator as the micro actuator currently in the on state in the switching order of the MA amplifiers in a case of rearranging the seek order by the NCQ.

FIG. 8 illustrates that the plurality of magnetic heads 13A specified by the magnetic head IDs="H0", "H4", and "H6" is driven by the corresponding micro actuator MA1 supplied with power by the first MA amplifier 30A. Similarly, it is illustrated that the plurality of magnetic heads 13B specified by the magnetic head IDs="H1", "H3", and "H5" is driven by the corresponding micro actuator MA2 supplied with power by the second MA amplifier 30B.

That is, in a case corresponding to the case illustrated in (A) of FIG. 8, the SoC 17 first sets the data access order to the magnetic head ID="H0"→the magnetic head ID="H4"→the magnetic head ID="H6" corresponding to the micro actuator MA1 in a case where the micro actuator currently in the on state is MA1, as illustrated in (B) of FIG. 8, on the basis of the control data table TB1 referred to at step S13. Therefore, the micro actuator MA is not shifted to the off state during this series of data accesses.

Subsequently, the SoC 17 selects the micro actuator MA2 as the switching destination MA amplifier (step S13). Subsequently, in a case illustrated in (B) of FIG. 8, as in the case in FIG. 5, switching destination MA amplifier start-up processing of turning on the micro actuator MA2 in the off state is performed (step S14). That is, the start-up processing of the second MA amplifier 30B is performed. More specifically, the output voltage of the second MA amplifier 30B is increased at the first slew rate.

Then, it is determined whether a first predetermined time elapses after the voltage applied to the plurality of micro actuators MA2 to be turned on by the second MA amplifier 30B starts to rise at the first slew rate (in the example in FIG. 5, whether it reaches time t2) (step S15). In a case where it is determined at step S15 that the first predetermined time does not elapse (step S15; No), a standby state is set.

In a case where it is determined at step S15 that the first predetermined time elapses, the voltage applied to the micro actuator MA2 should be a predetermined voltage in the on state (10 V in the case of the above-described example), and the vibration should be small, so that the micro actuator to be controlled is switched from the micro actuator MA1 to the micro actuator MA2 (step S16).

Since the micro actuator currently in the on state is the micro actuator MA2 driven by the second MA amplifier 30B, the data access order is set to the magnetic head ID="H1"→the magnetic head ID="H3"→the magnetic head ID "H5" corresponding to the micro actuator MA2.

In parallel with these operations, the first MA amplifier 30A, which is the MA amplifier of a switching source, starts to be shut down (step S17). More specifically, the output voltage of the first MA amplifier 30A starts to be decreased at the second slew rate. Then, it is determined whether the second predetermined time elapses after the voltage applied to the micro actuator MA1 to be turned off by the first MA amplifier 30A is decreased at the second slew rate (step S18).

In a case where it is determined at step S18 that the second predetermined time does not elapse (step S18; No), a standby state is set. In a case where it is determined at step S18 that the second predetermined time elapses (step S18; Yes), the first MA amplifier 30A corresponding to the micro actuator MA1 is shut down, and the processing is finished as the off state.

According to the configuration as described above, although switching of the micro actuator and eventually switching of the MA amplifier are conventionally required five times as illustrated in (A) of FIG. 8, switching of the micro actuator is only required once in the first embodiment illustrated in (B) of FIG. 8, and the influence of switching of the micro actuator, that is, switching of the MA amplifier can be reduced, and the positioning accuracy of the magnetic head can be improved.

In the above description, both the control illustrated in FIG. 5 and the control illustrated in (B) of FIG. 8 are performed, but it is possible to reduce the influence accompanying the switching of the micro actuator and improve the positioning accuracy of the magnetic head by only one of the controls.

Second Embodiment

Figure 9:
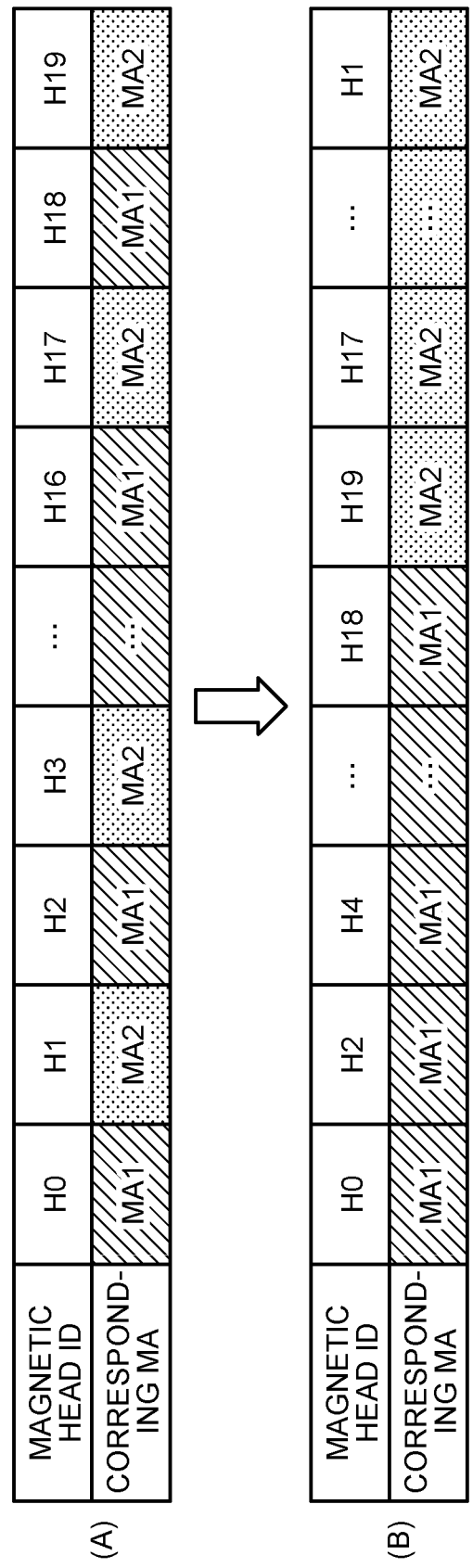
FIG. 9 is an illustrative diagram of an example of switching of an MA amplifier according to a second embodiment.

Next, a second embodiment is described. FIG. 9 is an illustrative diagram of an example of switching of an MA amplifier according to the second embodiment. (A) of FIG. 9 illustrates a switching order of MA amplifiers at the time of conventional sequential access, and (B) of FIG. 9 illustrates a switching order of the MA amplifiers at the time of sequential access of the second embodiment. Herein, the sequential access usually refers to processing of accessing an area in an ascending order of logical block addresses (LBAs). FIG. 9 also illustrates that a plurality of magnetic heads 13A specified by magnetic head IDs="H0", "H2", . . . and "H18" corresponding to a plurality of micro actuators MA supplied with power by a first MA amplifier 30A is driven. Similarly, it is illustrated that a plurality of magnetic heads 13B specified by magnetic head IDs="H1", "H3", . . . and "H19" corresponding to a plurality of micro actuators MA2 supplied with power by a second MA amplifier 30B is driven.

Therefore, in the second embodiment, in a case of switching from the MA amplifier of a switching source in an on state to the MA amplifier of a switching destination in an off state, a logical address is allocated in advance in such a manner that a magnetic head using the MA amplifier of the switching source comes earlier and a magnetic head using the MA amplifier of the switching destination comes later at the time of the sequential access. That is, in a case of the above-described example, the arrangement is performed in such a manner that the LBA is in the ascending order such that the plurality of magnetic heads 13A specified by the magnetic head IDs="H0", "H2", . . . and "H18" corresponding to the plurality of micro actuators MA1 supplied with power by the first MA amplifier 30A is followed by the plurality of magnetic heads 13B specified by the magnetic head IDs="H1", "H3", and "H19" corresponding to the plurality of micro actuators MA2 supplied with power by the second MA amplifier 30B.

Hereinafter, the processing flowchart in FIG. 7 will be referred to again. Conventionally, for example, as illustrated in (A) of FIG. 9, the data access order is assumed to be the magnetic head ID="H0"→the magnetic head ID="H2"→the magnetic head ID="H4"→the magnetic head ID="H16"→the magnetic head ID="H17"→the magnetic head ID="H18".

In this case also, as in the first embodiment, switching of the corresponding micro actuator frequently occurs, vibration occurs as illustrated in FIG. 3, and positioning accuracy is deteriorated.

That is, in a case corresponding to the case illustrated in (A) of FIG. 9, as illustrated in (B) of FIG. 9, the logical address is allocated in advance in such a manner that the data access order is the magnetic head ID="H0"→the magnetic head ID="H2"→the magnetic head ID="H4"→ . . . →the magnetic head ID="H18" corresponding to the micro actuator MA1 in a case where the micro actuator currently in the on state is MA1, that is, in a case where the MA amplifier that currently supplies the power is the first MA amplifier 30A.

Subsequently, the SoC 17 refers to the control data table TB1 (step S12), and when the access to the magnetic head corresponding to the micro actuator MA1 is finished, selects the second MA amplifiers 30B corresponding to the plurality of micro actuators MA2 as the switching destination MA amplifier on the basis of the sequential access order (step S13).

Subsequently, in a case illustrated in (B) of FIG. 9, as in the case in FIG. 4, switching destination MA amplifier start-up processing of turning on the micro actuator MA2 in the off state is performed (step S14). That is, the start-up processing of the second MA amplifier 30B is performed. More specifically, the output voltage of the second MA amplifier 30B is increased at the first slew rate.

Then, it is determined whether a first predetermined time elapses after the output voltage of the second MA amplifier 30B starts increasing at the first slew rate (step S15). In a case where it is determined at step S15 that the first predetermined time does not elapse (step S15; No), a standby state is set.

In a case where it is determined at step S15 that the first predetermined time elapses (step S15; Yes), the voltage applied to the micro actuator MA2 should be a predetermined voltage in the on state (10 V in the case of the above-described example), and the vibration should be small, so that the micro actuator to be controlled is switched from the micro actuator MA1 to the micro actuator MA2 (step S16).

Since the micro actuator currently in the on state is the micro actuator MA2, the data access order is set to the magnetic head ID="H19"→the magnetic head ID="H17"→ . . . →the magnetic head ID="H1" corresponding to the micro actuator MA2 according to a predetermined logical address.

In parallel with these operations, the first MA amplifier 30A, which is the MA amplifier of a switching source, starts to be shut down (step S17). More specifically, the output voltage of the first MA amplifier 30A starts to be decreased at the second slew rate. Then, it is determined whether the second predetermined time elapses after the voltage applied to the micro actuator MA1 to be turned off is decreased at the second slew rate (step S18). In a case where it is determined at step S18 that the second predetermined time does not elapse (step S18; No), a standby state is set. In a case where it is determined at step S18 that the second predetermined time elapses, the first MA amplifier 30A corresponding to the micro actuator MA1 is turned off, and the processing is finished.

According to the configuration as described above, although switching of the micro actuator is conventionally required several times as illustrated in (A) of FIG. 9, switching of the micro actuator is only required once in the second embodiment illustrated in (B) of FIG. 9, and the influence of switching of the micro actuator can be reduced, and the positioning accuracy of the magnetic head can be improved also at the time of sequential access.

Third Embodiment

Next, a third embodiment is described. FIG. 10 is an illustrative diagram of a control data table used in the third embodiment. A control data table TB2 of the third embodiment includes magnetic head ID data 41 for specifying each magnetic head, corresponding MA data 42 for specifying a micro actuator corresponding to the magnetic head specified by the magnetic head ID data 41, and vibration rank data 43 storing a vibration level at the time of micro actuator driving start. In this case, the vibration level is obtained by dividing magnitude of a vibration amount in the magnetic head 13 into a plurality of stages. In the above-described configuration, the vibration rank data is determined in advance by measurement, and in a case of the example in FIG. 10, there are three ranks: a vibration rank="S" in which the vibration amount is the smallest and the vibration amount is smaller than a first predetermined vibration amount, a vibration rank="L" in which the vibration amount is the largest and the vibration amount is larger than a second predetermined vibration amount larger than the first predetermined vibration amount, and a vibration rank="M" in which the vibration amount is not smaller than the first predetermined vibration amount and not larger than the second vibration amount.

For example, the corresponding micro actuator that drives a magnetic head specified by a magnetic head ID="H0" is a micro actuator MA1, and the corresponding vibration rank="S". Furthermore, the corresponding micro actuator that drives the magnetic head specified by a magnetic head ID="H3" is a micro actuator MA2, and the corresponding vibration rank="M". Moreover, the corresponding micro actuator that drives the magnetic head specified by a magnetic head ID="H18" is the micro actuator MA1, and the corresponding vibration rank="L".

Figure 11:
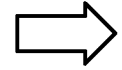
FIG. 11 is an illustrative diagram of an example of switching of an MA amplifier according to the third embodiment.

FIG. 11 is an illustrative diagram of an example of switching of the MA amplifier according to the third embodiment. (A) of FIG. 11 illustrates the switching order of the MA amplifiers at the time of conventional sequential access, and (B) of FIG. 11 illustrates the switching order of the MA amplifiers at the time of sequential access of the third embodiment. Hereinafter, the processing flowchart in FIG. 7 will be referred to again. Conventionally, for example, as illustrated in (A) of FIG. 11, a data access order is assumed to be the magnetic head ID="H0": MA1: vibration rank="S"→the magnetic head ID="H1": MA2: vibration rank="S"→the magnetic head ID="H2": MA1: vibration rank="M"→the magnetic head ID="H3": MA2: vibration rank="M"→ . . . →the magnetic head ID "H16": MA1: vibration rank="S"→the magnetic head ID="H17": MA2: vibration rank="S"→the magnetic head ID="H18": MA1: vibration rank="L"→the magnetic head ID: "H19": MA2: vibration rank "L". In this case also, as in the first embodiment, switching of the corresponding micro actuator frequently occurs, and the MA amplifier having a high vibration rank is driven after the switching, so that vibration further occurs as illustrated in FIG. 3, and there is a possibility that a time in which the positioning accuracy is deteriorated becomes longer. Therefore, in the third embodiment, in a case where the micro actuator to be turned on next is switched in the switching order of the MA amplifier in a case of rearranging a seek order at the time of the sequential access, LBA allocation is changed so as to use the magnetic head driven by the micro actuator having the lowest vibration rank among the selectable micro actuators.

In magnetic head allocation processing, the SoC 17 first refers to the control data table TB1 illustrated in FIG. 6 (step S11), and determines whether the MA amplifier needs to be switched on the basis of a content of the control data table (step S12). In a case where it is determined at step S12 that the MA amplifier does not need to be switched (step S12; No), the processing is finished. In a case where it is determined at step S12 that the MA amplifier needs to be switched (step S12; Yes), the control data table TB1 illustrated in FIG. 5 is referred to again (step S13). That is, in a case corresponding to the case illustrated in (A) of FIG. 11, the SoC 17 refers to the control data table TB2, and as illustrated in (B) of FIG. 11, first sets the data access order to the magnetic head ID="H0": MA1: vibration rank="S"→the magnetic head ID="H2": MA1: vibration rank="S"→ . . . →the magnetic head ID="H18": MA1: vibration rank="L"→the magnetic head ID="H16": MA1: vibration rank="S" corresponding to the micro actuator MA1 in a case where the micro actuator currently in the on state is MA1.

Subsequently, when the access to the magnetic head corresponding to the micro actuator MA1 is finished, the SoC 17 selects the micro actuator MA2 as the switching destination MA amplifier (step S13). Subsequently, in a case illustrated in (B) of FIG. 11, as in the case in FIG. 5, switching destination MA amplifier start-up processing of turning on the micro actuator MA2 in the off state is performed (step S14).

Then, it is determined whether the first predetermined time elapses after the voltage applied to the micro actuator MA2 to be turned on is increased at the first slew rate (step S15). In a case where it is determined at step S15 that the first predetermined time elapses, the voltage applied to the micro actuator MA2 should be a predetermined voltage in the on state (10 V in the case of the above-described example), and the vibration should be small, so that the micro actuator to be controlled is switched from the micro actuator MA1 to the micro actuator MA2 (step S16).

Since the micro actuator currently in the on state is the micro actuator MA2, the data access order is set to the magnetic head ID="H17": MA2: vibration rank="S"→the magnetic head ID="H19": MA2: vibration rank="L"→ . . . →the magnetic head ID="H1": MA2: vibration rank="S" corresponding to the micro actuator MA2. Therefore, in the case of the above-described example, when the micro actuator is switched, the magnetic head corresponding to the vibration rank="S" is to be switched, so that the switching time of the micro actuator can be shortened, and the positioning accuracy can be improved.

In parallel with the operations, it is determined whether the second predetermined time elapses after the MA amplifier of the switching source is shut down (step S17) and the voltage applied to the micro actuator MA1 to be turned off is decreased at the second slew rate (step S18). In a case where it is determined at step S18 that the second predetermined time does not elapse (step S18; No), a standby state is set. In a case where it is determined at step S18 that the second predetermined time elapses, the MA amplifier corresponding to the micro actuator MA1 is shut down, and the processing is finished as the off state.

According to the configuration as described above, although switching of the micro actuator is conventionally required several times as illustrated in (A) of FIG. 11, switching of the micro actuator is only required once in the third embodiment illustrated in (B) of FIG. 11, and the influence of switching of the micro actuator can be reduced, and the positioning accuracy of the magnetic head can be improved also at the time of sequential access.

Fourth Embodiment

In the above description, each micro actuator and the MA amplifier corresponding to the micro actuator have been described; however, as illustrated in FIG. 1, since the magnetic disks 12 face the actuator arms 22 other than the actuator arm 22 at the uppermost portion and the actuator arm 22 at the lowermost portion in FIG. 1 in the vertical direction, the magnetic head 13 is provided in each of the magnetic disks 12. In this fourth embodiment, the micro actuators 25 corresponding to the upper and lower pair of magnetic heads 13 can be independently controlled, and are exclusively turned on.

Here, the upper and lower pair means that the magnetic heads 13 are respectively provided on a first surface of one actuator arm 22 (for example, an upper surface of the actuator arm 22 in FIG. 1) and a second surface opposite to the first surface in a direction intersecting with a recording surface of the magnetic disk 12 with respect to the first surface (in a case of the above-described example, a lower surface of the actuator arm 22 in FIG. 1). More specifically, a magnetic head 13B is provided on the first surface, and a magnetic head 13A is provided on the second surface.

In this case, among the second MA amplifier 30B that drives the micro actuator 25 (=micro actuator MA2) corresponding to the magnetic head 13B provided on the upper surface side of the actuator arm 22 and the first MA amplifier 30A that drives the micro actuator 25 (=micro actuator MA1) corresponding to the magnetic head 13A provided on the lower surface side of the actuator arm 22, one MA amplifier in the on state is set as the MA amplifier of the switching source, and the other MA amplifier is set as the MA amplifier of the switching destination.

When switching is performed from the MA amplifier of the switching source to the MA amplifier of the switching destination in the off state, it is desirable to set a voltage slew rate (slew rate at the time of rising) in a case where the MA amplifier in the off state is switched to the on state and a voltage slew rate (slew rate at the time of trailing) in a case where the MA amplifier in the on state is switched to the off state to values avoiding a resonance frequency of the corresponding micro actuator.

As a result, it becomes possible to suppress the vibration of the micro actuator due to the switching of the MA amplifier, and thus, access performance is not degraded. As a result, also in the fourth embodiment, it is possible to reduce the influence of the vibration accompanying the switching of the micro actuator and improve the positioning accuracy of the magnetic head. Moreover, it is possible to provide a magnetic disk device capable of performing high-speed access by suppressing an increase in access time due to switching of the micro actuator.

As described above, according to each embodiment, it is possible to reduce the influence of the vibration accompanying the switching of the micro actuator and improve the positioning accuracy of the magnetic head. Moreover, it is possible to provide a magnetic disk device capable of performing high-speed access by suppressing an increase in access time due to switching of the micro actuator.

Note that, the program executed by the SoC of this embodiment is provided as a computer program product incorporated in advance in a ROM and the like.

The program executed by the magnetic disk device according to this embodiment may be provided as a computer program product by being recorded in a file in an installable format or an executable format in a semiconductor memory device such as a USB memory and a solid state drive (SSD) or a computer-readable recording medium such as a digital versatile disk (DVD).

Moreover, the program executed by the magnetic disk device of this embodiment may be stored on a computer connected to a network such as the Internet and provided by being downloaded via the network. Furthermore, the program executed by the magnetic disk device of this embodiment may be provided or distributed via a network such as the Internet.

For example, the frequency of switching of the micro actuator can be reduced by limiting the switching of the micro actuator to only a case where a long-distance seek occurs. In the above description, the case where two micro actuators (MA1 and MA2) driven by two different MA amplifiers are switched is described; however, three or more (three or more systems of) micro actuators driven by three or more different MA amplifiers may be switched.

Furthermore, the start-up and shut down of the MA amplifier are not limited to a constant inclination, and this may be started up or shut down so that the output voltage becomes stepwise as indicated by a broken thin line Lstp in FIG. 5. In this case, the number of steps (the number of stages) and the height of one stage can be appropriately set from the viewpoint of suppressing the vibration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first MA (micro actuator) amplifier configured to drive a first micro actuator that positions a corresponding magnetic head;
a second micro actuator configured to position a corresponding magnetic head;
a second MA amplifier configured to drive the second micro actuator; and
a controller configured to, when performing switching from an MA amplifier of a switching source in an on state to an MA amplifier of a switching destination in an off state, start up the MA amplifier of the switching destination while maintaining the MA amplifier of the switching source in the on state, and perform the switching from the MA amplifier of the switching source to the MA amplifier of the switching destination after a predetermined time elapses, wherein
the predetermined time is set as a time in which vibration accompanying switching of a micro actuator corresponding to the MA amplifier of the switching destination is smaller than a predetermined magnitude.

2. The magnetic disk device according to claim 1, wherein the controller is configured to perform control so that a driving force increases stepwise at a predetermined slew rate or at a predetermined ratio in the MA amplifier of the switching destination.

3. A magnetic disk device comprising:
a first MA amplifier configured to drive a first micro actuator that positions a corresponding magnetic head;
a second micro actuator configured to position a corresponding magnetic head; and
a second MA amplifier configured to drive the second micro actuator, wherein
the magnetic heads are respectively provided on a first surface of one actuator arm and a second surface opposite to the first surface in a direction intersecting with a recording surface of a magnetic disk with respect to the first surface,
the micro actuators corresponding to a pair of the magnetic heads corresponding to the actuator arm are independently controllable and exclusively turned on,
the magnetic disk device further comprises a controller configured to set, among a pair of the MA amplifiers corresponding to the pair of the magnetic heads, one MA amplifier in an on state as an MA amplifier of a switching source and another as an MA amplifier of a switching destination, and perform switching from the MA amplifier of the switching source to the MA amplifier of the switching destination in an off state, and
the controller is configured to set a voltage slew rate when the MA amplifier in the off state is switched to an on state and a voltage slew rate when the MA amplifier in the on state is switched to the off state to a value avoiding a resonance frequency of the corresponding micro actuator.

4. A magnetic disk device comprising:
a first MA amplifier configured to drive a first micro actuator that positions a corresponding magnetic head;
a second micro actuator configured to position a corresponding magnetic head;
a second MA amplifier configured to drive the second micro actuator; and
a controller configured to arrange, when rearranging a seek order of the magnetic heads and switching from an MA amplifier of a switching source in an on state to an MA amplifier of a switching destination in an off state according to the rearranged seek order, the magnetic head using the MA amplifier of the switching source in an earlier order and the magnetic head using the MA amplifier of the switching destination in a later order in the rearranging.

5. The magnetic disk device according to claim 1, wherein a logical address is allocated in advance so that magnetic heads driven by the same MA amplifier are continuously accessed at a time of sequential access.

6. The magnetic disk device according to claim 3, wherein a logical address is allocated in advance so that magnetic heads driven by the same MA amplifier are continuously accessed at a time of sequential access.

7. The magnetic disk device according to claim 1, wherein a vibration level at a time of switching to the micro actuator is divided into a plurality of ranks in advance, and
the controller is configured to select, when switching the MA amplifier, an MA amplifier belonging to a rank with smallest vibration as an MA amplifier selectable as the MA amplifier of the switching destination.

8. The magnetic disk device according to claim 3, wherein
a vibration level at a time of switching to the micro actuator is divided into a plurality of ranks in advance, and
the controller is configured to select, when switching the MA amplifier, an MA amplifier belonging to a rank with smallest vibration as an MA amplifier selectable as the MA amplifier of the switching destination.

9. The magnetic disk device according to claim 1, wherein
the controller is configured to switch the MA amplifier when a long-distance seek of a predetermined distance or longer occurs.

10. The magnetic disk device according to claim 3, wherein
the controller is configured to switch the MA amplifier when a long-distance seek of a predetermined distance or longer occurs.

11. A method of controlling a magnetic disk device including a plurality of sets of micro actuators and corresponding MA amplifiers, each of the micro actuators positioning a corresponding magnetic head, the method comprising:
maintaining, when performing switching from an MA amplifier of a switching source in an on state to an MA amplifier of a switching destination in an off state, the MA amplifier of the switching source in the on state;
starting up the MA amplifier of the switching destination at a predetermined slew rate while maintaining the MA amplifier of the switching source in the on state; and
performing the switching from the MA amplifier of the switching source to the MA amplifier of the switching destination after a predetermined time elapses, the predetermined time being a time in which vibration accompanying switching of a micro actuator corresponding to the MA amplifier of the switching destination is smaller than a predetermined magnitude.

12. The method of controlling the magnetic disk device according to claim 11, wherein
a logical address is allocated in advance so that magnetic heads driven by the same MA amplifier are continuously accessed at a time of sequential access.

13. The method of controlling the magnetic disk device according to claim 11, further comprising:
dividing a vibration level at a time of switching to the micro actuator into a plurality of ranks in advance; and
selecting, when switching the MA amplifier, an MA amplifier belonging to a rank with smallest vibration as an MA amplifier selectable as the MA amplifier of the switching destination.

14. The method of controlling the magnetic disk device according to claim 11, further comprising:
switching the MA amplifier when a long-distance seek of a predetermined distance or longer occurs.

15. A method of controlling a magnetic disk device,
the magnetic disk device including a first MA amplifier configured to drive a first micro actuator that positions a corresponding magnetic head, a second micro actuator configured to position a corresponding magnetic head, and a second MA amplifier configured to drive the second micro actuator,
the method comprising:
when rearranging a seek order of the magnetic heads,
arranging a magnetic head using an MA amplifier of a switching source in an earlier order and a magnetic head using an MA amplifier of a switching destination in a later order in the rearranging; and
switching from the MA amplifier of the switching source in an on state to the MA amplifier of the switching destination in an off state according to the rearranged seek order.

16. A computer program product including a computer-readable recording medium including a plurality of computer-executable instructions for controlling a magnetic disk device,
the magnetic disk device including a first MA amplifier configured to drive a first micro actuator that positions a corresponding magnetic head, a second micro actuator configured to position a corresponding magnetic head, and a second MA amplifier configured to drive the second micro actuator,
the plurality of instructions causing a computer to execute:
maintaining, when performing switching from an MA amplifier of a switching source in an on state to an MA amplifier of a switching destination in an off state, the MA amplifier of the switching source in the on state;
starting up the MA amplifier of the switching destination at a predetermined slew rate while maintaining the MA amplifier of the switching source in the on state; and
performing the switching from the MA amplifier of the switching source to the MA amplifier of the switching destination after a predetermined time elapses, the predetermined time being a time in which vibration accompanying switching of a micro actuator corresponding to the MA amplifier of the switching destination is smaller than a predetermined magnitude.

17. A computer program product including a computer-readable recording medium including a plurality of computer-executable instructions for controlling a magnetic disk device,
the magnetic disk device including a first MA amplifier configured to drive a first micro actuator that positions a corresponding magnetic head, a second micro actuator configured to position a corresponding magnetic head, and a second MA amplifier configured to drive the second micro actuator,
the plurality of instructions causing a computer to execute:
when rearranging a seek order of the magnetic heads,
arranging a magnetic head using an MA amplifier of a switching source in an earlier order and a magnetic head using an MA amplifier of a switching destination in a later order in the rearranging; and
switching from the MA amplifier of the switching source in an on state to the MA amplifier of the switching destination in an off state according to the rearranged seek order.

18. The magnetic disk device according to claim 3, wherein
the controller is configured to perform control so that a driving force increases stepwise at a predetermined slew rate or at a predetermined ratio in the MA amplifier of the switching destination.

* * * * *